United States Patent [19]

Sobotta

[11] 4,069,724
[45] Jan. 24, 1978

[54] FLAT CURVE CAM AND FOLLOWER CONSTRUCTION

[75] Inventor: Reinhard Sobotta, Braunschweig, Germany

[73] Assignee: Rollei-Werke Franke & Heidecke, Braunschweig, Germany

[21] Appl. No.: 777,834

[22] Filed: Mar. 15, 1977

[30] Foreign Application Priority Data

Mar. 27, 1976 Germany .............................. 2613181

[51] Int. Cl.² ........................ F16H 53/06; F16H 25/08
[52] U.S. Cl. ........................................... 74/569; 74/54;
F16H/25/16
[58] Field of Search ................... 74/567, 568, 569, 53, 74/54, 55, 56

[56] References Cited

U.S. PATENT DOCUMENTS

| 1,979,195 | 10/1934 | Govare et al. | 74/567 X |
| 2,470,766 | 5/1949 | Durning | 74/54 UX |

FOREIGN PATENT DOCUMENTS

| 657,163 | 5/1929 | France | 74/54 |
| 295,282 | 11/1916 | Germany | 74/569 |
| 462,608 | 3/1951 | Italy | 74/569 |

Primary Examiner—Samuel Scott
Assistant Examiner—Don E. Ferrell

Attorney, Agent, or Firm—Stonebraker, Shepard & Stephens

[57] ABSTRACT

A cam and follower construction in which a flat plate has a plurality of cam grooves intersecting each other and in which the cam followers are in the form of cylindrical pins or rollers, one in each cam groove. To insure that each follower stays in its own groove and does not accidentally pass into the wrong groove at the point where they intersect, the grooves are made of different widths and different depth, the widest groove having the shallowest depth and the narrower groove having a greater depth. Thus the follower of a wide cam groove cannot pass into an intersecting narrower groove because the groove is too narrow to receive the follower, and the follower of the narrower groove cannot pass into the wider groove at the intersection, because the narrower groove is deeper and the shallower wide groove cannot accommodate it. In a modification of the construction, all of the cam grooves may have the same width near the surface of the cam plate, cooperating with follower pins or rollers of the same diameter, one groove being of a certain depth, the other grooves having a main part of lesser depth but a supplementary deeper groove receiving a guide pin extension on the follower, which serves to prevent the follower from accidentally entering the wrong cam groove where the grooves intersect.

4 Claims, 3 Drawing Figures

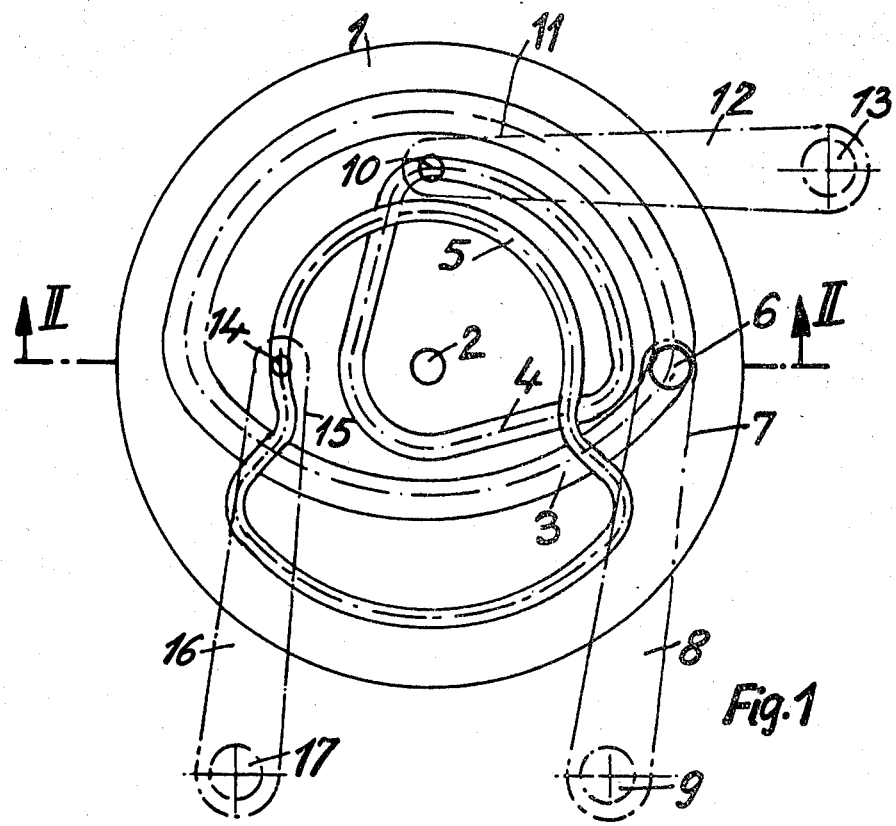
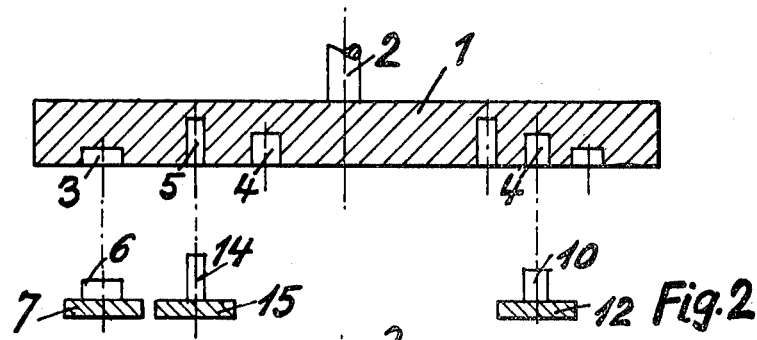
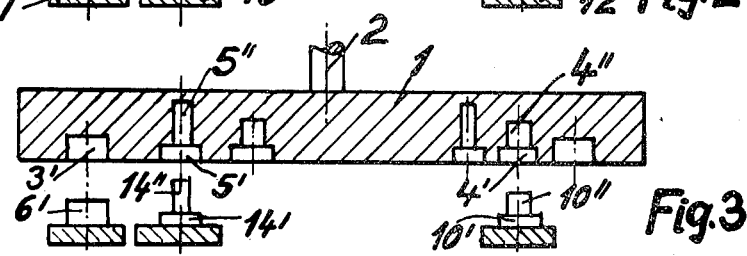

FLAT CURVE CAM AND FOLLOWER CONSTRUCTION

BACKGROUND OF THE INVENTION

The present invention relates to cams of the flat curve type, that is, cams in the form of grooves in the surface of a flat plate. Such cams form one type of the general class of box cams, wherein the cam follower is positively constrained to move in both directions, that is, inwardly toward the center of rotation of the cam as well as outwardly away from the center of rotation. This is in distinction to the more common type of cam, such as a plate cam, where the cam shape is on the periphery of a rotating plate and the cam follower is constrained positively only when engaged with the rise portion of the cam periphery, the inward movement of the follower toward the center of rotation of the cam, when in contact with a fall portion of the cam, being caused by a spring or the like.

Box cams, constraining movement of the follower in both directions, are particularly suitable for high precision mechanical instruments, such for example as motion picture cameras and motion picture projectors, where rapid movements with high rates of acceleration and deceleration may be required, and where it may be desirable to dispense with the springs that would be required if peripherally shaped plate cams were used. Because of limited space available in precision mechanisms such as motion picture cameras and projectors, it may be desirable to combine two or more cams as separate grooves on a single flat cam plate. If the necessary shape of the cams is such that the cam grooves or curves intersect each other, this creates problems to insure that the respective cam followers do not accidentally enter the wrong cam groove at the points where they intersect.

The ideal cam follower for use with a cam in the form of a curve or groove in a flat plate, is a cylindrical pin or roller fitting snugly in the width of the groove. However, this cannot be used as the follower in the conventional form of cam groove construction where two grooves intersect each other, because of the danger that the follower may enter the wrong groove at the point where two grooves intersect. Therefore, to prevent this, it has been proposed to use a sliding block rather than a cylindrical pin or roller, the block being so shaped that it cannot enter the wrong groove at the intersection. This creates difficulties, however, if the shape of the cam curve has portions of very small radius.

This problem is solved, according to the present invention, by using a novel combination of width and depth dimensions for the cross sections of the respective cam grooves. The cam followers fit snugly in the width of the grooves. Therefore, the cam follower of a wider groove cannot pass accidentally into a narrower groove where the two grooves intersect. Also, the narrower groove is made deeper than the wider groove, and the cam follower of the narrower groove extends deeper into this groove than the depth of the wider groove, so cannot pass accidentally into the wider groove at the point of intersection.

In a modification, as described below, the main or force-transmitting parts of the respective cam grooves may all be of the same width, but narrower guiding grooves of different widths and depths may be formed in the bottoms of the main force-transmitting grooves, to receive guide pins which prevent entry of the followers into the wrong grooves but which do not come under stress except momentarily at the points of intersection.

BRIEF DESCRIPTION OF THE DRAWINGS

FIG. 1 is a top plan view of a flat cam plate having a plurality of cam grooves or curves formed in accordance with the present invention, and illustrating the cooperating cam followers;

FIG. 2 is a cross section taken approximately on the line II—II of FIG. 1; and

FIG. 3 is a view similar to FIG. 2, illustrating a modification.

DESCRIPTION OF THE PREFERRED EMBODIMENTS

Referring now to FIGS. 1 and 2, the cam plate 1 is attached to and rotates with the drive shaft 2. A plurality of cam curves are formed as grooves in the surface of the plate, three such cam grooves being illustrated at 3, 4, and 5. As will be seen, these grooves intersect or cross each other, which is a situation often required in order to provide the various movements necessary in the particular machinery or mechanism which is to be controlled by the cam.

In accordance with the principles already briefly indicated above, these three grooves are of different widths, the groove 3 being the widest, the groove 4 being somewhat narrower, and the groove 5 being still narrower.

Extending into the groove 3 and fitting snugly in the width thereof is the cam follower 6, in the form of a cylindrical pin or roller mounted on the end 7 of the follower lever 8 which is fixed to a shaft 9, the oscillating movements of which are to be controlled by the shape of the curve of the cam groove 3.

Similarly, a follower 10 in the form of a cylindrical pin or roller fitting snugly in the width of the cam groove 4, is mounted on the end 11 of the follower lever 12 mounted on a shaft 13, the oscillatory movements of the lever 12 thus being controlled by the shape of the cam 4. Likewise, a cam follower 14 in the form of a cylindrical pin or roller fitting snugly in the width of the cam groove 5 is mounted on the end 15 of the follower lever 16 which is mounted on the shaft 17. Hence the oscillation of the follower lever 16 is controlled by the shape of the cam curve 5.

It will be noted from FIG. 2 that the widest cam groove 3 has the shallowest depth, and its follower 6 is correspondingly short. The cam groove 4, somewhat narrower than the groove 3, is of greater depth, and its follower 10 correspondingly longer. The cam groove 5 is still narrower, and of still greater depth, its follower 14 being longer than the follower 10. From this it follows that, at the points where the respective cam grooves intersect, the followers cannot accidentally enter the wrong grooves. For example, the follower 10 in the groove 4 is of too great a diameter to enter the groove 5 where they intersect, and the follower 14 in the groove 5 is too long to enter the shallower groove 4 where they intersect, even though the diameter of the follower 14 is sufficiently small so that it could enter the groove 4, if it were not for the shallower depth thereof. For the same reason, the follower 14 cannot enter the wider groove 3 where they intersect, because the groove 3 is too shallow.

An alternative or modified construction, accomplishing the same purposes, is indicated in FIG. 3. Here, the flat cam plate 1 on the shaft 2 is provided with grooves 3', 4', and 5'. The groove 3' and its follower 6' are of the same width as in the previous embodiment. The other two grooves 4' and 5' have main force-transmitting portions which are both of the same width and both of the same depth with respect to each other, but somewhat shallower than the groove 3'. The cylindrical collars or rollers 10' and 14' fit in these grooves 4' and 5', respectively. In the bottoms of these grooves 4' and 5' there are narrower guiding grooves 4" and 5" respectively, developed according to the same principles as in the previous embodiment. That is, the supplementary groove 4" is wider but shallower than the supplementary groove 5" which is narrower and deeper. The cam followers 10' and 14' are provided with guide pin extensions 10" and 14", respectively, which fit in the respective supplementary grooves 4" and 5".

With this construction, the upper parts of the grooves, near the surface of the plate 1, together with their cooperating and snugly fitting follower parts, serve as the main force-transmitting portions of the mechanism. The guide pin extensions 10" and 14", under stress only at the points of intersection of the cam grooves, to prevent the followers from entering the wrong grooves, and during the rest of the travel of the followers around the grooves (that is, except at the points of intersection) these guide pins do not come under any stress. The actual control function is assumed by the wide grooves 3', 4', and 5' and their cooperating pin or roller follower portions 6', 10', and 14'.

In this embodiment, due to the smaller surface pressure, there is a reduction in wear and also a reduction in the noise of operation, since the guide pin extensions 10" and 14" are subjected to stress, for all practical purposes, only at the points of intersection of the cam grooves.

What is claimed is:

1. A cam and follower construction comprising a flat plate having a plurality of curved cam grooves therein, said grooves intersecting each other, and a plurality of cam followers engaged in said grooves, characterized by the fact that at least a portion of a second groove is of lesser width and greater depth than the width and depth, respectively, of a first groove, and that at least a portion of the cam follower in the first groove is of sufficient width so that it can not enter the second groove, and at least a portion of the cam follower in the second groove extends in that groove to a depth greater than the depth of the first groove so that it can not enter the first groove.

2. The invention of claim 1, wherein said portions of said cam followers are of substantially cylindrical shape.

3. The invention of claim 1, wherein each of said grooves is of substantially uniform width throughout substantially its enire depth.

4. The invention of claim 1, wherein at least one of said grooves has a wider portion adjacent the surface of said plate and a narrower portion at a greater depth from the surface of said plate, and the cam follower in such groove has a wider portion engaged in and controlled by the wider portion of its groove and a narrower guide portion extending into the narrower and deeper portion of its groove.

* * * * *